J. S. BLAUVELT.
STEERING GEAR FOR SHIPS.
APPLICATION FILED JAN. 12, 1909.
1,001,340.
Patented Aug. 22, 1911.
7 SHEETS—SHEET 1.
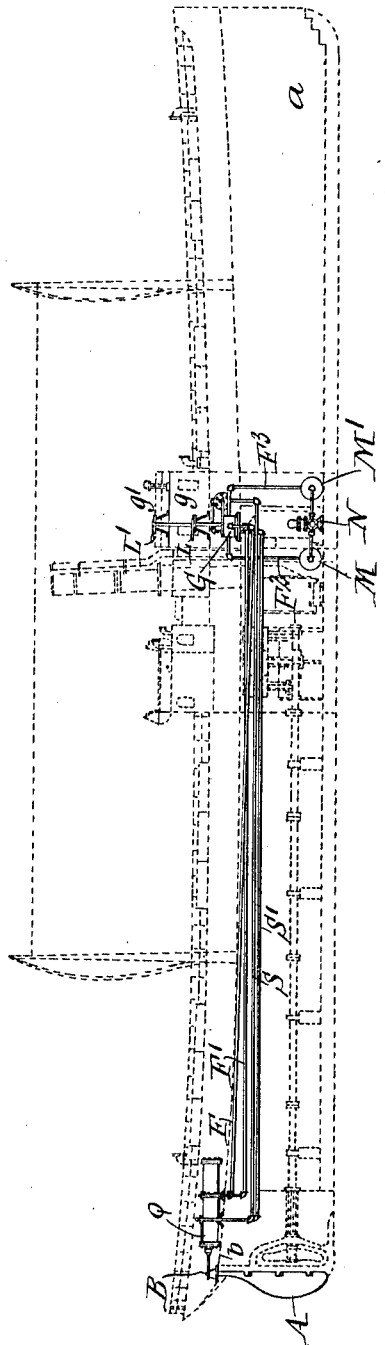
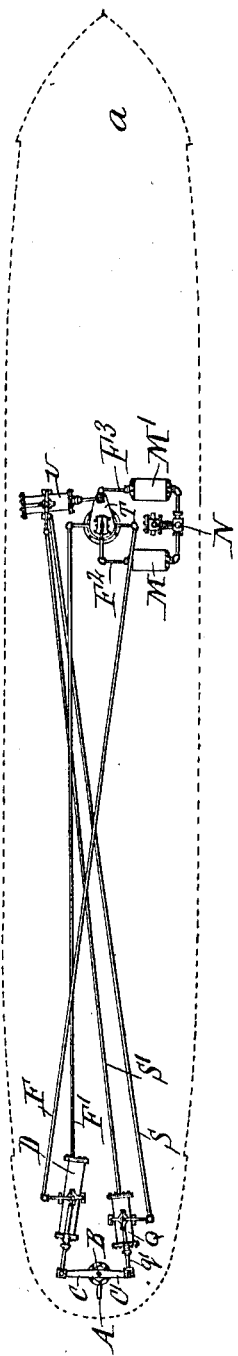

J. S. BLAUVELT.
STEERING GEAR FOR SHIPS.
APPLICATION FILED JAN. 12, 1909.
1,001,340.
Patented Aug. 22, 1911.
7 SHEETS—SHEET 2.
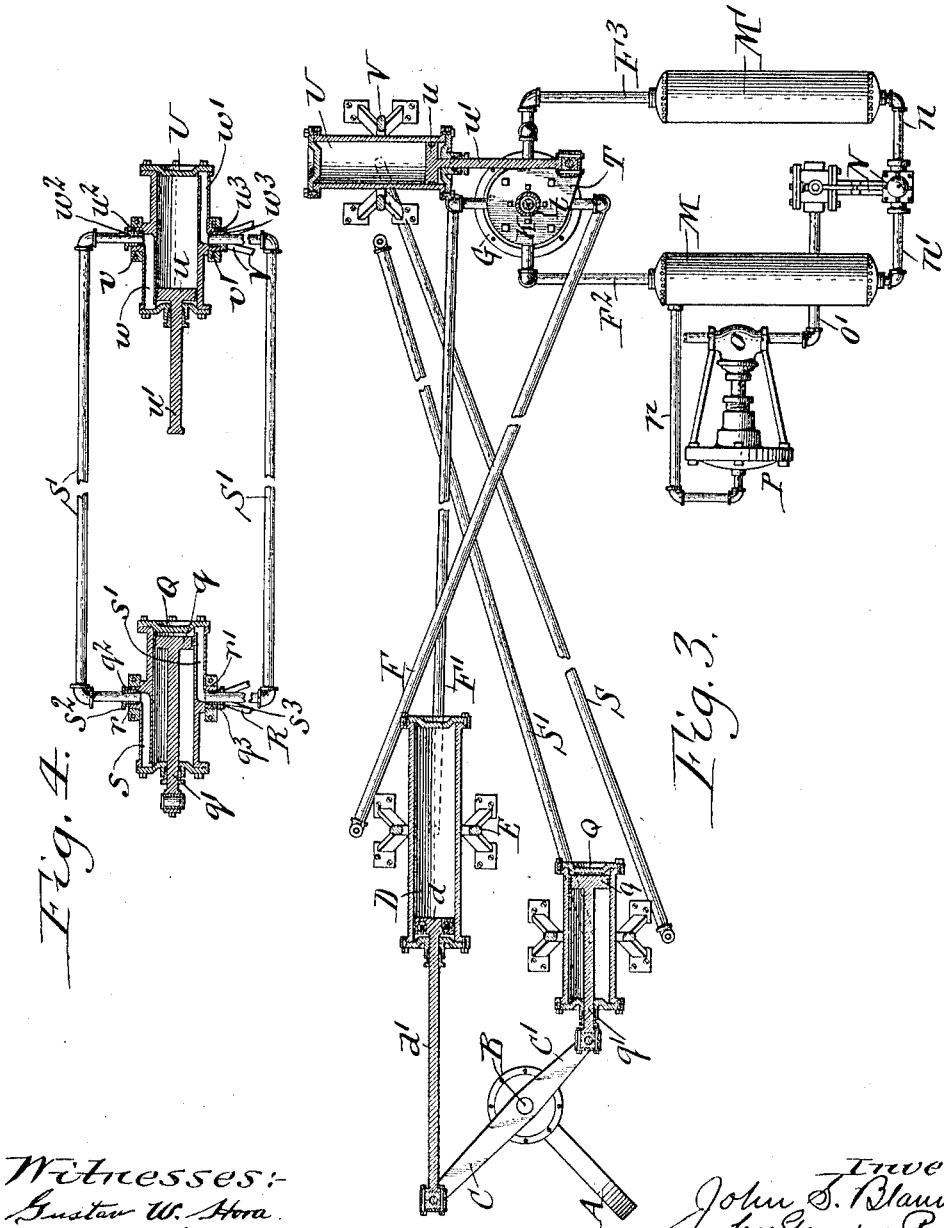

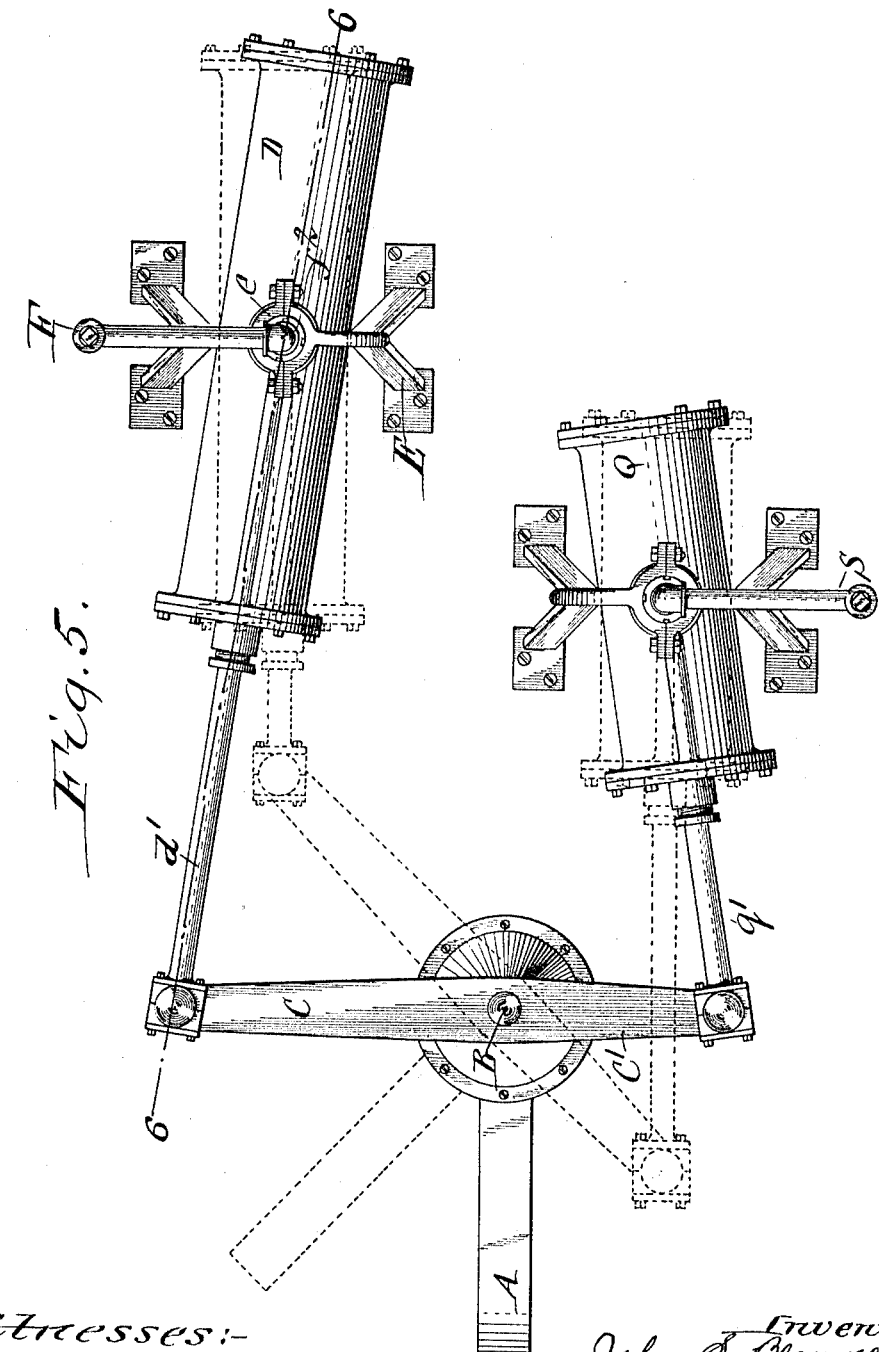

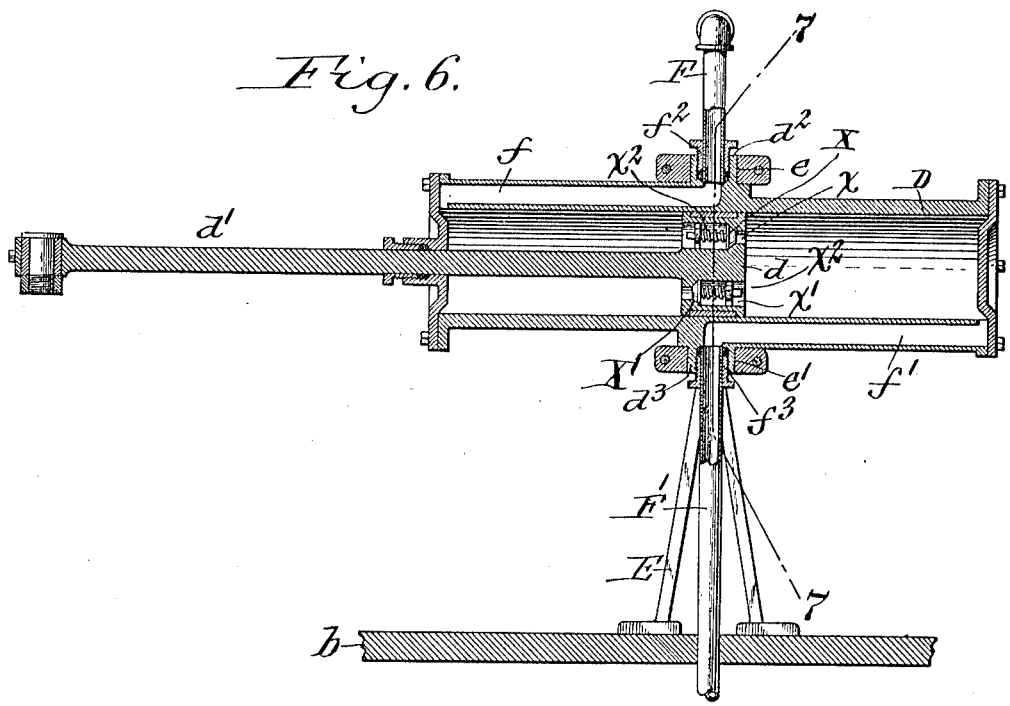
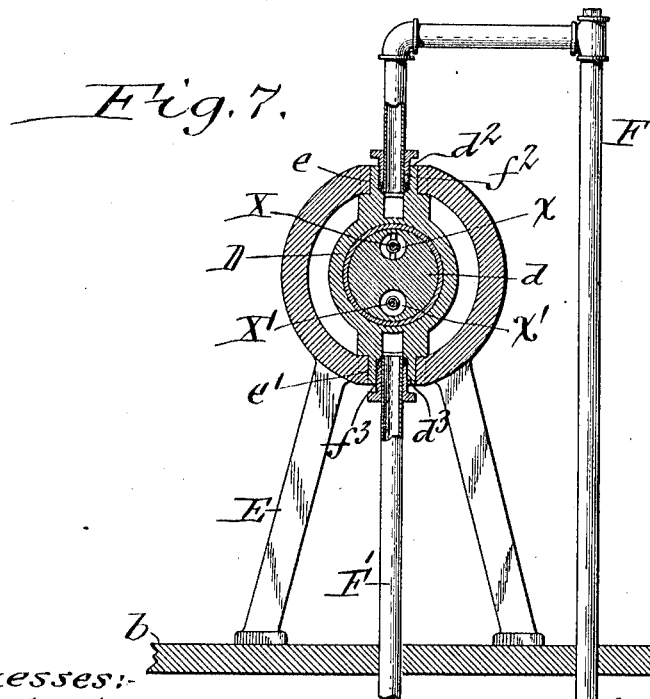

J. S. BLAUVELT.
STEERING GEAR FOR SHIPS.
APPLICATION FILED JAN. 12, 1909.
1,001,340.
Patented Aug. 22, 1911.
7 SHEETS—SHEET 5.
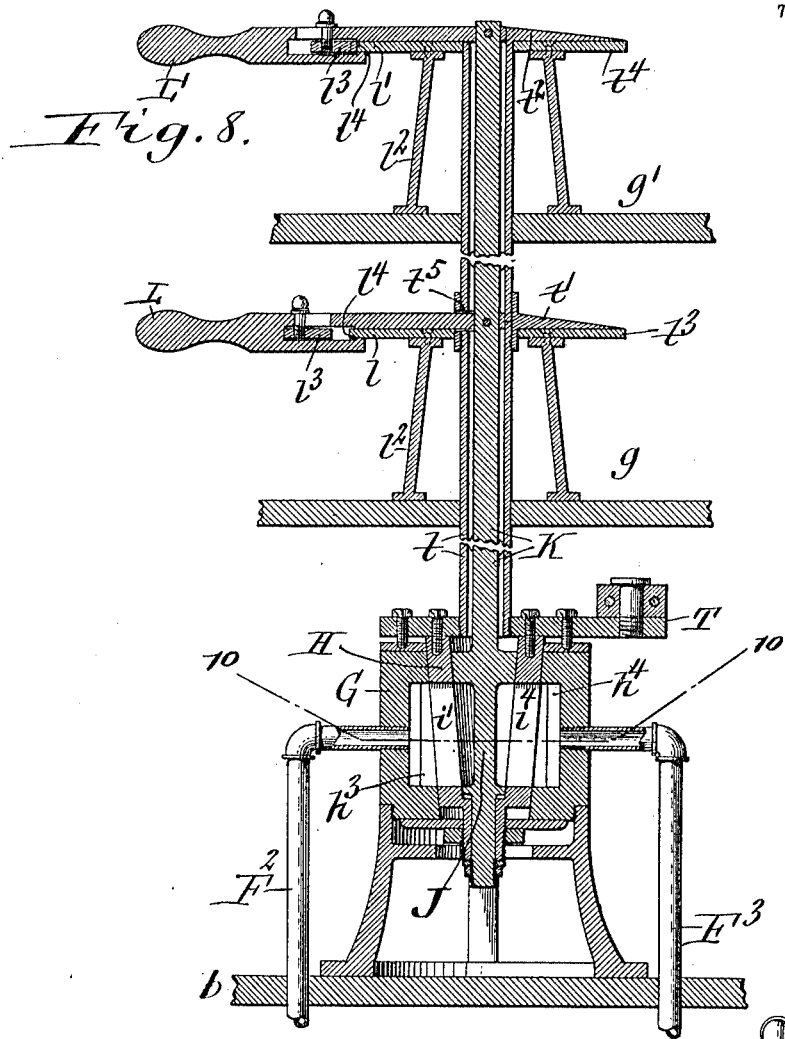
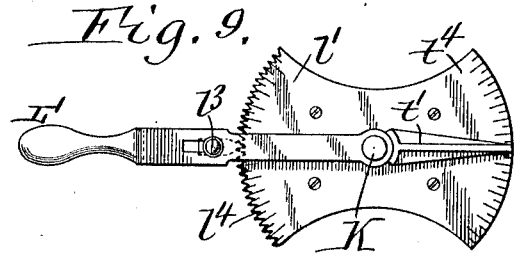
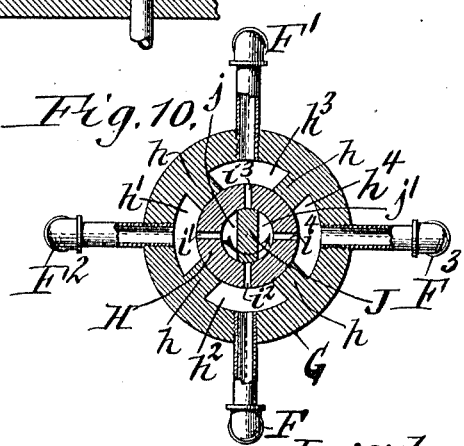

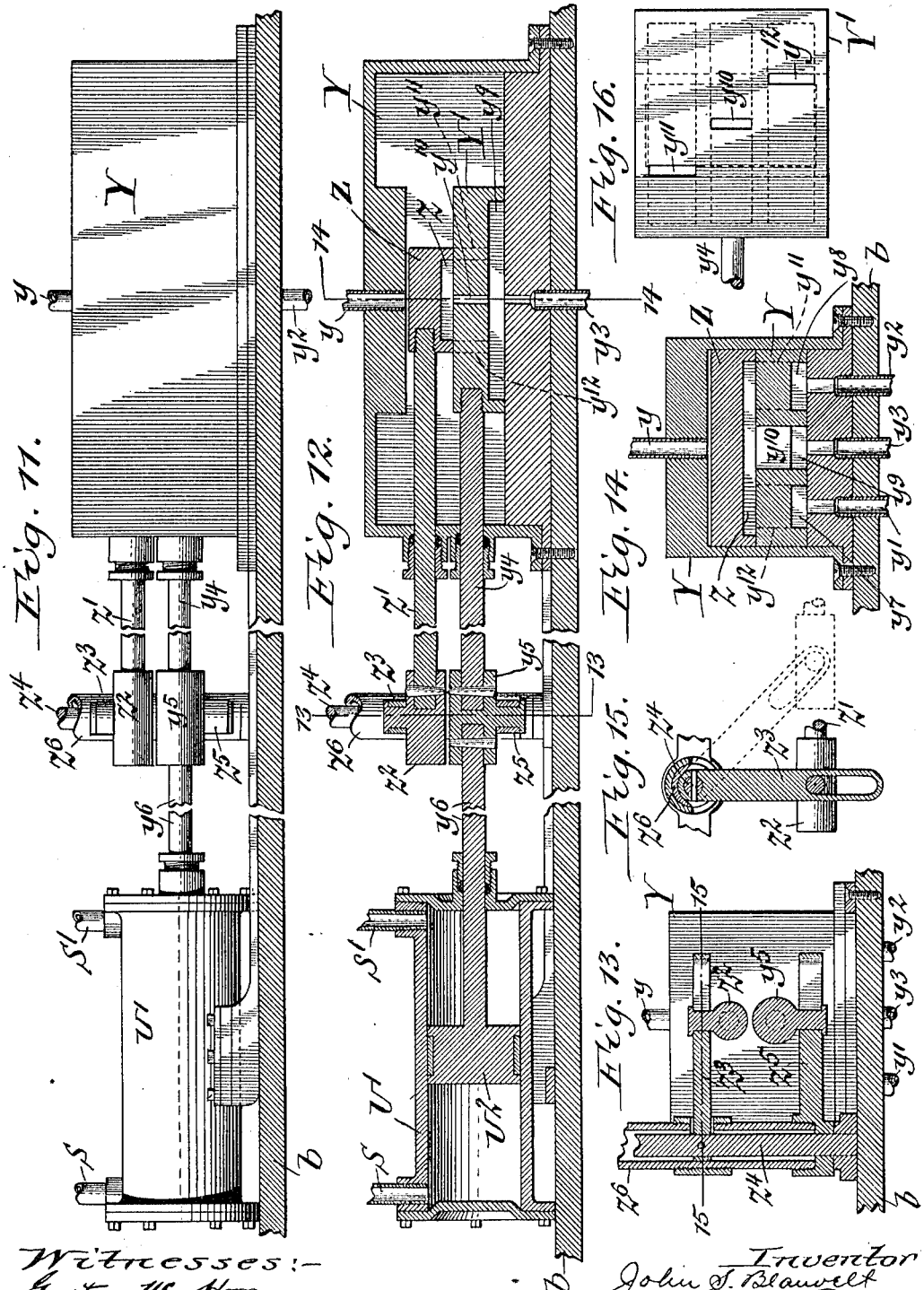

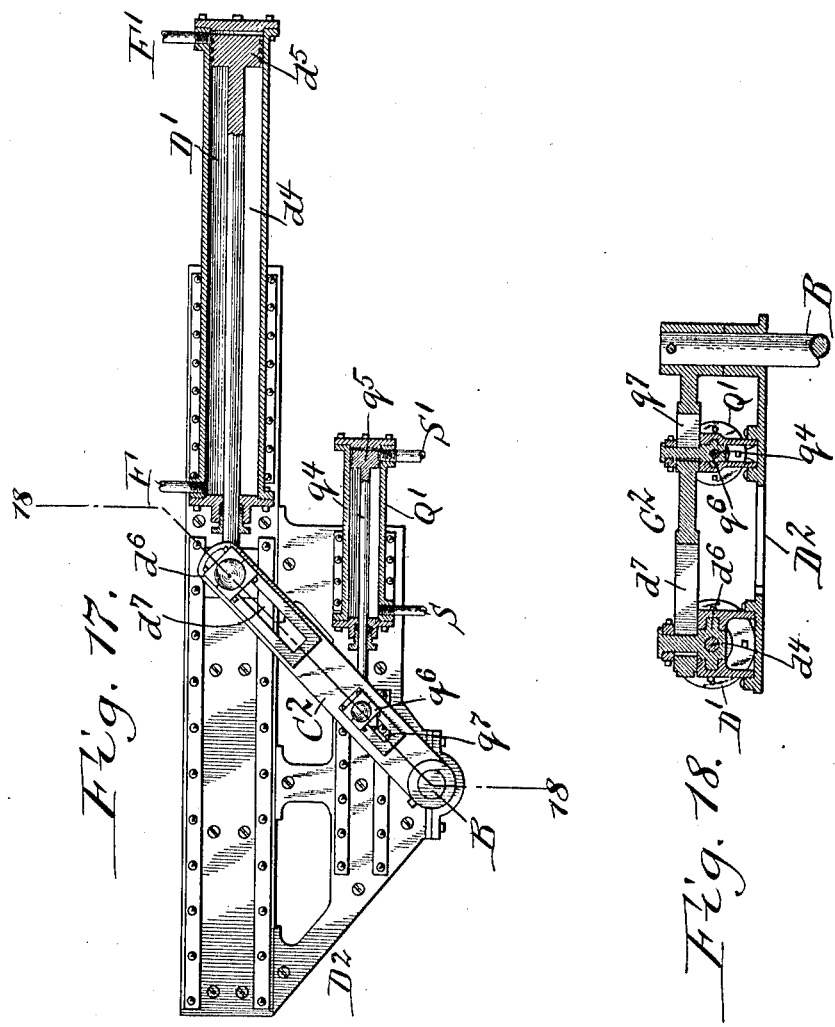

UNITED STATES PATENT OFFICE.

JOHN S. BLAUVELT, OF BUFFALO, NEW YORK, ASSIGNOR OF ONE-HALF TO DANIEL J. McCRORY, OF BUFFALO, NEW YORK.

STEERING-GEAR FOR SHIPS.

1,001,340.  Specification of Letters Patent.  Patented Aug. 22, 1911.

Application filed January 12, 1909. Serial No. 471,840.

*To all whom it may concern:*

Be it known that I, JOHN S. BLAUVELT, a citizen of the United States, residing at Buffalo, in the county of Erie and State of New York, have invented a new and useful Improvement in Steering-Gear for Ships, of which the following is a specification.

This invention relates to a steering gear for ships.

In the steering gears for ships as heretofore constructed there is more or less slack or looseness in the connection between the rudder and the devices which operate or control the same which renders it impossible to shift the rudder promptly and reliably, nor is it possible for the helmsman or steersman to determine with certainty whether the rudder responds to the controlling mechanism and is moving into the position desired. In the steering gears heretofore in use the rudder is also held so rigidly in place that it does not ease off sufficiently resulting often in breakage of some of the parts when the rudder is subjected to undue pressure.

The object of this invention is to provide a steering gear of this character which can be controlled with ease and certainty from any desired part of the ship; which will cause the rudder to be automatically arrested when the same has been turned to the desired position; which enables the operator to determine the position and movement of the rudder, and which permits the rudder when subjected temporarily to undue strains to yield and then automatically return the rudder to the position at which it had been set after the undue pressure on the same has been removed.

In the accompanying drawings consisting of 7 sheets: Figure 1 is a side elevation, on a reduced scale, of my improved steering gear applied to a ship, the latter being shown by dotted lines. Fig. 2 is a top plan view of the same. Fig. 3 is a sectional top plan view of this steering gear, on an enlarged scale. Fig. 4 is a diagrammatic vertical longitudinal section of the primary and secondary cylinders and connecting parts of the cut-off mechanism. Fig. 5 is a top plan view, on a still larger scale, of the rudder, the pilot cylinder and the primary cut off cylinder and connecting parts. Fig. 6 is a vertical longitudinal section of the pilot cylinder taken in line 6—6, Fig. 5. Fig. 7 is a vertical cross section in line 7—7, Fig. 6. Fig. 8 is a vertical section of the valve mechanism for controlling the operation of the steering gear. Fig. 9 is a top plan view of one of the steering and indicating devices associated with this valve mechanism. Fig. 10 is a horizontal section in line 10—10, Fig. 8. Fig. 11 is a side elevation showing a modified construction of the valve mechanism. Fig. 12 is a vertical longitudinal section of the same. Figs. 13 and 14 are vertical cross sections in the correspondingly numbered lines in Fig. 12. Fig. 15 is a fragmentary horizontal section in line 15—15, Fig. 13. Fig. 16 is a detached top plan view of the cut off valve employed in the construction shown in Figs. 11-15. Fig. 17 is a sectional top plan view showing a modified construction of the pilot and primary cut-off cylinders. Fig. 18 is a vertical transverse section in line 18—18, Fig. 17.

Similar letters of reference indicate corresponding parts throughout the several views.

A represents the rudder which is mounted to turn horizontally on the stern of the ship *a* in any suitable manner and B the rudder post projecting upwardly from the upper end of the rudder above the adjacent deck *b*. As shown in Figs. 1-4, the upper end of the rudder post has secured transversely thereto a tiller having two arms C, C¹ which project horizontally in opposite directions from the rudder post, but if desired this tiller may be otherwise constructed. The arm C of the tiller is comparatively long and is operatively connected with the devices whereby the rudder is shifted into different positions while the other arm C¹ of the tiller is comparatively short and connected with the devices whereby the pressure medium is automatically cut-off from the rudder shifting mechanism.

The motor which is under the control of the helmsman or steersman for shifting the rudder may be variously constructed but that shown in Figs. 1, 2, 3, 5, 6 and 7, is constructed as follows: D represents a horizontal pilot cylinder which is preferably arranged lengthwise above the deck and pivotally supported so that it is capable of oscillating or rocking in a horizontal plane. *d* is a piston arranged in the cylinder and connected with the long arm C of the tiller by means of a piston rod $d^1$ passing through the rear head of the cylinder D. Although the pilot cylinder may be pivotally supported in various ways so as to permit it to change its position to correspond with the varying position of the tiller, the means for this purpose shown in the drawings are suitable and comprise vertical trunnions $d^2$, $d^3$ arranged centrally on the upper and lower sides of the pilot cylinder, and a standard E secured to the deck $b$ and provided with upper and lower bearings $e$, $e^1$ in which said trunnions of the pilot cylinder are journaled.

Upon admitting an actuating medium such as water, oil or other liquid under pressure into one end or the other of the pilot cylinder the piston therein will be moved either forwardly or backwardly and thereby turn the rudder connected therewith through the medium of the tiller and piston rod in one direction or the other. Although the character of the pressure medium for this purpose may be varied I prefer to employ oil or other liquid which is not liable to freeze at low temperature. As the live or active pressure medium is admitted to one end of the pilot cylinder for moving the piston therein away from the end of the cylinder, the spent pressure medium is permitted to escape from the other end of the cylinder. In order to permit of supplying and withdrawing the pressure medium into and out of opposite ends of the pilot cylinder and at the same time permit the latter to oscillate freely on its trunnions, this cylinder is provided with two branch passages or conduits $f$, $f^1$ one passage $f$ of which extends from the front end of the cylinder to the center of the upper trunnion $d^2$ while the other $f^1$ extends from the rear end of the cylinder to the center of the lower trunnion $d^3$ and with these trunnions are respectively connected the rear ends of two stationary distributing pipes F, $F^1$ by means of upper and lower rotatable connections or swivel joints $f^2$, $f^3$ which are arranged axially in line with the trunnions.

Various means may be provided for controlling the admission of the actuating medium into the pilot cylinder and its escape therefrom, those shown in Figs. 1, 2, 3, 8, 9 and 10 being constructed as follows: G represents a valve casing which is mounted on any suitable part of the ship but preferably in the forward part thereof on the deck $b$ so as to permit of convenient manipulation thereof by the helmsman or steersman in the pilot house $g$ or on the bridge $g^1$ overhead. On its inner side this valve casing is provided with four radially and equidistant ribs or partitions $h$ the inner edges of which are engaged by a rotatable circular cut-off valve H which will be hereinafter described and which together with the valve casing and its partitions forms four valve chambers $h^1$, $h^2$, $h^3$, $h^4$ arranged in an annular row about the axis of said circular valve. The front ends of the distributing pipes F, $F^1$ communicate with the valve chambers $h^2$, $h^3$ which are arranged on diametrically opposite sides of the valve casing while the remaining two valve chambers $h^1$, $h^4$ are connected respectively with a supply pipe $F^2$ whereby the live or active pressure medium is supplied for actuating the piston in the pilot cylinder and an exhaust pipe $F^3$ whereby the spent pressure medium or actuating fluid is withdrawn from the pilot cylinder. The circular cut-off valve H is provided with four equidistant radial ports $i^1$, $i^2$, $i^3$, $i^4$ which normally open respectively into the valve chambers $h^1$, $h^2$, $h^3$, $h^4$, as shown in Fig. 10. Within the cylindrical cut-off valve is arranged a plug-shaped pilot valve J which extends diametrically across the bore of the cut-off valve and engages at opposite edges with the surface thereof so that transfer chambers $j$, $j^1$ are formed within the cut-off valve on opposite sides of the plug valve. Upon rotating the central or plug valve its opposite ends may be brought over the distributing ports so as to cover the same, as shown in Fig. 10, or these distributing ports may be uncovered by the cut-off valve and each of these ports placed in communication either with the supply port or the exhaust port of the cut-off valve.

As shown in Fig. 10, the position of the parts of the valve mechanism correspond to the position of the parts shown in full lines in Fig. 5, in which the rudder is in its central position. If it is now desired to turn the rudder to port side, as indicated by dotted lines in Fig. 5, the central or pilot valve J is turned in the direction of the arrow, Fig. 10, so as to uncover the distributing ports $i^2$, $i^3$ and place the supply port $i^1$ in communication with the distributing port $i^2$ and the exhaust port $i^4$ in communication with the distributing port $i^3$. In this position of the valve mechanism, the pressure medium supplied by the pipe $F^2$ passes successively through the supply chamber $h^1$, supply port $i^1$, transfer chamber $j$, distributing port $i^2$, distributing chamber $h^2$, distributing pipe F and branch passage $f$ of the pilot cylinder to the rear end of the latter, whereby the piston therein will be moved forwardly to turn the rudder to the port side of the ship, as indicated by dotted lines in Fig. 4. The spent actuating medium in the front end of the pilot cylinder during this time is discharged therefrom and passes successively through the branch passage $f^1$ of the pilot cylinder, distributing pipe $F^1$, distributing chamber $h^3$, distributing port $i^3$, transfer chamber $j^1$, exhaust port $i^4$, exhaust chamber $h^4$ and out through the exhaust pipe $F^3$. If it is desired to turn the rudder toward the starboard side of the ship the cut-off valve H is turned in a direction opposite to that indicated by the arrow in Fig. 10, until the distributing port $h^3$ and the supply port $h^1$ are placed in communication, and the distributing port $h^2$, and the exhaust port $h^4$ are placed in communication. In this position of the valve mechanism the pressure medium supplied by the pipe $F^2$ passes successively through the supply chamber $h^1$, supply port $i^1$, transfer chamber $j$, distributing port $i^3$, distributing chamber $h^3$, distributing pipe $F^1$ and branch passage $f^1$ to the front end of the pilot cylinder whereby the piston of the latter is moved rearwardly and the rudder is shifted toward the starboard side of the ship, as shown by full lines in Fig. 3. At the same time the spent pressure medium in the rear end of the pilot cylinder is discharged therefrom and passes successively through the branch passage $f$, distributing pipe F, distributing chamber $h^2$, distributing port $i^2$, transfer chamber $j^1$, exhaust port $i^4$, exhaust chamber $h^4$ and out through the exhaust pipe $F^3$.

The central or pilot valve may be turned in the manner described by any suitable mechanism from any suitable part of the ship but, as shown in the drawings, the mechanism for this purpose is constructed to permit of turning this valve either from the pilot house $g$ or from the bridge $g^1$ of the ship which are arranged vertically in line with the valve mechanism. This pilot valve operating device is best shown in Figs. 8, 9 and 10 and comprises a central upright shaft or stem K which projects upwardly from the pilot valve through the floor of the pilot house and the bridge, a radial handle or arm L secured to the valve stem K within the pilot house, and a radial handle or arm $L^1$ secured to said stem above the bridge. By this means the pilot valve may be turned by the helmsman or steersman at either of these places. In order to enable the pilot valve to be set at a predetermined position, the handles or arms L, $L^1$ are arranged respectively to traverse dials $l$, $l^1$ each of which is preferably constructed in the shape of a segment and supported by means of a standard $l^2$ on the adjacent floor or other stationary part of the ship and each arm may be held in its adjusted position by means of a catch or detent pawl $l^3$ movable radially on the adjusting arm and adapted to engage with one or the other of a segmental row of notches $l^4$ in the edge of the dial, as shown in Figs. 8 and 9.

The pressure medium or liquid which is supplied by the pipe $F^2$ for shifting the pilot piston backwardly and forwardly in the pilot cylinder is preferably supplied from a delivery or supply reservoir or tank M in which the same is stored under pressure and the spent pressure medium which is discharged by the exhaust pipe $F^3$ is preferably stored in a receiving reservoir or tank $M^1$. As the liquid is withdrawn from the supply delivery tank means are provided for replenishing the same from the liquid which is returned into the receiving tank, this mechanism being preferably constructed as follows: N represents a pump which is operated by a steam or other pressure medium and which has the inlet of its pumping cylinder connected by a pipe $n$ with the receiving tank $M^1$ while its outlet is connected by a pipe $n^1$ with the delivery tank M. $o$ represents a valve arranged in the pipe $o^1$ which supplies the pressure medium for operating the pump. This valve is adapted to be opened and closed as the pressure in the delivery tank falls and rises, this being effected by connecting the plug or stopper of the valve $o$ with the actuating member of a pressure regulator P which is connected by a pipe $p$ with the delivery tank M. When the pressure in the delivery tank drops below the normal the regulator P operates to open the valve $o$ and admits steam or other actuating medium to the engine or motor of the pump, thereby causing liquid to be transferred from the receiving tank to the delivery tank. When the normal pressure in the delivery tank has again been restored, the regulator P operates to close the valve $o$, thereby stopping the pump and arresting the further transfer of liquid from the receiving tank to the delivery tank. By this means the pressure in the delivery tank is maintained automatically so as to insure the required pressure on the liquid for properly and promptly actuating the piston of the pilot cylinder when it is desired to change the course of the ship or the position of the rudder. When the steering gear is in working condition the pilot cylinder and the conduits and other parts connected therewith are filled with the actuating medium or liquid so that the parts to be actuated move promptly the instant the liquid is propelled.

Means are provided which operate to shift the cut-off valve so as to automatically arrest the rudder after the same has moved to a predetermined position corresponding to the position at which the pilot valve has been previously set by either of its arms L, $L^1$. The mechanism for thus operating the cut-off valve is best shown in Figs. 3, 8, 9 and 10 and is constructed as follows: Q represents a primary cut-off cylinder which is arranged lengthwise on the deck $b$ adjacent to the rudder post and which contains a piston $q$ connected with the short arm of the tiller by means of a piston rod $q^1$ passing through the rear head of said cut-off cylinder. The latter is capable of horizontal oscillation to permit the same and its piston and rod to adapt themselves to the position of the tiller, this being effected by means of vertical trunnions $q^2$, $q^3$ arranged on its upper and lower sides, and journaled in upper and lower bearings $r$, $r^1$ formed on a standard R which is supported on the adjacent part of the deck $b$. An actuating medium which preferably consists of a liquid under pressure is alternately introduced into and exhausted from opposite ends of the cylinder Q by means of two branch passages $s$, $s^1$ formed on the primary cut-off cylinder, the upper one $s$ extending from the rear end of the primary cut-off cylinder to the upper trunnion while the lower one $s^1$ extends from the front end of the cylinder to the lower trunnion, and two transfer or circulating pipes S, $S^1$ which are connected at their rear ends respectively with the upper and lower trunnions by means of swivel or rotatable joints or connections $s^2$, $s^3$, as shown in Figs. 4 and 5.

T represents a crank arm which forms part of the means for operating the cut-off valve and which is secured radially to the upper end of the cut-off valve, as shown in Figs. 3 and 8.

U represents a secondary cut-off cylinder forming part of a motor whereby the cut-off valve is oscillated and which contains a piston $u$ connected with the valve arm T by a piston rod $u^1$ passing through the rear head of the cylinder. This cylinder is made capable of oscillation in a horizontal plane by means of upper and lower vertical trunnions $u^2$, $u^3$ arranged centrally at the top and bottom thereof and journaled in upper and lower bearings $v$ $v^1$ arranged on a standard V on the adjacent part of the deck $b$. Communication is established between the front end of the primary cut-off cylinder and the front end of the secondary cut-off cylinder and also between the rear end of the primary cut-off cylinder and the rear end of the secondary cut-off cylinder, this being preferably effected by means of upper and lower branch passages $w$, $w^1$ formed in the secondary cut-off cylinder, the upper passage $w$ extending from the rear end of this cylinder to the upper trunnion, and the lower passage $w^1$ extending from the front end of this cylinder to the lower trunnion, and swiveling or rotatable joints or connections $w^2$, $w^3$ between the front ends of the transfer pipes S, $S^1$ and the upper and lower trunnions $u^2$, $u^3$, respectively. When this apparatus is in use the cylinders Q, U and the pipes and passages connecting opposite ends of the same are completely filled with liquid, preferably oil or similar material which is not liable to freeze at low temperatures. As the rudder moves from one end of its stroke to the other, the primary cut-off piston connected therewith is caused to move from one end of its cylinder to the other thereby expelling the liquid from one of its ends and receiving liquid in its opposite end. The liquid thus expelled from the primary cut-off cylinder is forced into one end of the secondary cut-off cylinder whereby the piston in the latter is driven toward the opposite end of the same and the liquid in the last mentioned end of the secondary cut-off cylinder is delivered into the filling end of the primary cut-off cylinder. As the rudder is moved in the opposite direction, the movement of the piston in the primary cylinder causes a reversal of the flow of the liquid in these cylinders and the conduits connecting the same, whereby the piston in the secondary cylinder is moved in the opposite direction. Inasmuch as the piston of the secondary cylinder is connected with the arm of the cut-off valve the latter is simultaneously moved with the rudder and always occupies a definite position relatively to the latter. This movement of the cut-off valve in harmony with the rudder is utilized to effect an automatic closure of its distributing ports $i^2$, $i^3$ in coöperation with the pilot valve when the rudder has reached the predetermined position corresponding to the position at which the pilot valve has been set by the helmsman.

As shown in full lines in Fig. 5, the rudder is in its central position, and while the rudder is in this position the cut-off valve and the pilot valve are in their central positions so as to close both of the distributing ports, as shown in Fig. 10.

If it is desired to move the rudder from its central position, shown by full lines in Fig. 5, toward the port side of the ship, as indicated by dotted lines in the same figure, the pilot valve is turned in the direction of the arrow to an extent corresponding to the angle which it is desired to shift the rudder toward the port side. When the pilot valve is thus shifted, the supply and distributing ports $i^1$, $i^2$ of the cut-off valve are placed in communication so that the pressure medium from the supply pipe is admitted to the rear end of the pilot cylinder, whereby the piston therein is moved forwardly and the rudder is turned toward the port side and at the same time the exhaust port $i^4$ and the distributing port $i^3$ of the cut-off valve are placed in communication so as to permit the liquid to pass from the front end of the pilot cylinder into the receiving tank. While the rudder is being thus moved by the piston of the pilot cylinder, the pilot valve remains stationary but the cut-off valve is moved or turned in the same direction in which the pilot valve was moved in setting the same by reason of the shifting of the liquid in the cylinders Q, U and the pistons therein which is effected by the connection between the rudder and the primary cylinder Q, and the connection between the piston of the secondary cut-off cylinder and the cut-off valve. This movement of the cut-off valve in the described direction continues until its distributing ports $i^2$, $i^3$ are again brought in line with opposite ends of the pilot valve and are closed by the same, thereby automatically shutting off the supply of pressure medium to the rear end of the pilot cylinder and the escape of the liquid from the front end thereof, whereby the movement of the rudder is arrested. The extent which the cut-off valve moves in the manner described varies according to the distance which the pilot valve has been moved away from the distributing ports. When it is desired to shift the rudder only to a small extent in either direction from its central position or from the position which it previously occupied, the pilot valve is moved in the same measure away from the distributing ports and it follows that the rudder would only move a corresponding distance and shift the cut-off valve in the same direction as the pilot valve has previously been moved for causing the distributing ports of the cut-off valve to be again closed by the opposite ends of the pilot valve. This operation of the cut-off valve relatively to the pilot valve is the same upon setting the pilot valve for turning the rudder either toward the right or toward the left from any position of rest which it may occupy. Inasmuch as the pilot cylinder and the supply and exhaust conduits connected therewith are always filled with the actuating liquid, the rudder is shifted promptly and reliably in accordance with the shifted position of the pilot valve and after the rudder has reached the predetermined position it is reliably held there under normal condition.

Means are provided for enabling the helmsman in the pilot house or on the bridge to observe the movements of the rudder and the position which it at any time occupies. The means for this purpose are preferably associated with the cut-off valve and the pilot valve, as shown in Figs. 1, 3, 8 and 9. The same consist of an upright tubular shaft $t$ surrounding the cut-off valve stem or shaft throughout nearly its entire height and secured at its lower end to the cut-off valve arm T and provided adjacent to the pilot valve arms with pointers $t^1$, $t^2$. The latter preferably project from the hollow cut-off valve shaft in a direction opposite to the pilot valve handles L, $L^1$ and traverse dials or scales $t^3$, $t^4$ which are mounted on the standards $l^2$ and preferably formed in one piece with the pilot valve dials $l$, $l^1$. The upper pilot valve arm $L^1$ is arranged above the upper end of the cut-off valve shaft but the lower pilot valve arm L in the pilot house projects through a segmental slot $t^5$, formed in the adjacent portion of the cut-off valve shaft. The pointers $t^1$, $t^2$ traverse the dials or scales $t^3$, $t^4$ in the same measure as the cut-off valve is moved by the rudder, thereby enabling the helmsman to observe the movements of the rudder and the position which it at any time occupies so that he can govern himself accordingly.

In the absence of any provision to permit the rudder to yield when an undue pressure is exerted against the same, as for instance when the same strikes an obstruction or when it is hit by a heavy wave, the rudder or its operating mechanism would be liable to break. In order to permit the rudder to yield when an abnormal pressure or strain of the character indicated is exerted against the same, relieving means are provided which preferably consist of two relief ports or passages $x$, $x^1$ extending through the pilot piston from one face to the other and two relief valves X, $X^1$ arranged respectively in these openings or passages and each held by means of a spring $x^2$ against a seat in the respective passage, as shown in Figs. 3, 6 and 7. The seat in one of these relief passages faces in one direction while that of the other relief passage faces in the opposite direction and the valves engaging therewith move opposite relatively to each other upon opening or closing their respective passages. The springs of the relief valve are of sufficient strength or tension to hold the relief valves shut and thus render the pilot piston practically solid or imperforate when the rudder encounters normal resistance or is subjected to normal pressure. When, however, the rudder encounters abnormal resistance or is subjected to abnormal pressure one or the other of the relief valves in the pilot piston, depending upon the direction of movement of the rudder and pilot piston, is forced away from its seat by the body of the liquid in that end of the pilot cylinder toward which the pilot piston is moved, thereby permitting the pilot piston and the rudder to give way under the abnormal strains to which the rudder is subjected by permitting the liquid to pass through the pilot piston from its advancing side to its trailing side. After the undue pressure or strain on the rudder has terminated, the relief valve of the pilot piston which was temporarily opened is now closed and this piston is again practically solid as before. During this abnormal movement of the rudder the cut-off valve is also shifted in the same measure by reason of the operative connection between the same and the rudder, although the pilot valve remains in the position where it has been set by the helmsman. Assuming that the officer has left the pilot valve in its central position, as shown in Fig. 10, and the rudder is in the corresponding central position, as shown in full lines in Fig. 5, and that a wave of abnormal power has shifted the rudder toward port side, as indicated by dotted lines in the same figure, this will cause the cut-off valve to be turned independently of the pilot valve in the direction of the arrow, Fig. 10, to a corresponding extent and thereby uncover the distributing ports $i^2$, $i^3$, whereby the supply port $i^1$ is placed in communication with the distributing port $i^3$ and pressure liquid is admitted to the front end of the pilot cylinder and causes the piston therein to be moved backwardly, and the exhaust port $i^4$ is placed in communication with the distributing port $i^2$ so as to permit the liquid displaced from the rear end of the pilot cylinder to escape from the distributing pipe F through the exhaust pipe. The pilot piston and the rudder are thus returned to the normal position from which they have been displaced by abnormal strains against the rudder and while the pilot piston and rudder are thus returning to the normal position corresponding to the position of the pilot valve, the cut-off valve is also turned in a reversed direction or opposite to that indicated by Fig. 10, until the distributing ports are again closed by opposite ends of the pilot valve. When this occurs the normal relation of the parts is again restored this being effected automatically without requiring any attention on the part of the helmsman. This operation of the relieving means and the automatic restoration means for the rudder and other parts operates reverse to the manner just described when the rudder is deflected toward starboard from its normal position.

Instead of mounting the pilot cylinder and primary and secondary cut-off cylinders so that they can adapt themselves to the parts which they actuate, these cylinders may be stationary and suitable means may be provided for connecting the rods of their pistons with the parts which they actuate to accord with this changed construction. For instance, as shown in Figs. 17 and 18 the pilot cylinder $D^1$ and the primary cut-off cylinder $Q^1$ are mounted on a stationary base $D^2$ and the rods $d^4$, $q^4$ of their pistons $d^5$, $q^5$ are connected with slides $d^6$, $q^6$ which move in radial guideways $d^7$, $q^7$ on the tiller $C^2$. In this construction the tiller has but one arm and the piston rods of the pilot cylinder and the primary cut-off cylinder are connected with this arm on the same side of the rudder post instead of being connected with separate tiller arms, as shown in Fig. 5. The advantage in employing stationary cylinders, as shown in Fig. 17, is that the liquid pipes F, $F^1$ S, $S^1$ may be directly connected with opposite ends of these cylinders and the use of swivel joints between the same and the cylinders therefore avoided.

In Figs. 11 and 12 the secondary cut-off cylinder $U^1$ containing a piston $U^2$ is also made stationary so as to avoid the use of swivel connections between the same and the transfer pipes S, $S^1$. These figures also show a modified construction of the valve mechanism in which the pilot and cut-off valves have a reciprocating movement instead of an oscillating movement. This modified construction of valve mechanism is as follows: Y represents the valve chamber which has its upper side connected with a pressure supply pipe $y$ through which the pressure mediums such as a liquid is supplied while its lower side is connected with distributing pipes $y^1$, $y^2$ and an exhaust pipe $y^3$, the latter being at the center of the valve chamber and the distributing pipes on opposite sides of the exhaust pipe and leading to opposite ends of the pilot cylinder. Resting upon the bottom of this valve chamber is a sliding cut-off valve $Y^1$ the stem or rod $y^4$ of which passes through the valve chamber and is connected by a coupling head $y^5$ with the opposing end of the piston rod $y^6$ of the stationary cut-off cylinder $U^1$. On its underside the cut-off valve is provided with three longitudinal grooves $y^7$, $y^8$, $y^9$ which are constantly in register, with the distributing and exhaust pipes $y^1$, $y^2$, $y^3$, respectively. The cut-off valve $Y^1$ is also provided centrally with an exhaust port $y^{10}$ extending from its upper side into its central groove and on opposite sides of the exhaust port with distributing ports $y^{11}$, $y^{12}$ extending from its upper side into the respective side grooves, said distributing ports being on opposite sides of a transverse line drawn through the central exhaust port so that these ports together are arranged in a diagonal row relatively to the direction of movement of the cut-off valve. Z represents a pilot valve which slides lengthwise on top of the cut-off valve and parallel thereto and which is provided on its underside with a cavity or recess $z$ which is adapted to connect either one or the other of the distributing ports $y^{11}$, $y^{12}$ with the exhaust port $y^{10}$ of the cut-off valve. The pilot valve is provided with a stem or rod $Z^1$ which extends through the valve chamber and is connected outside of the latter by means of a coupling head $Z^2$ with a rock arm $Z^3$ on an upright adjusting shaft $z^4$. This shaft performs the same function as the pilot shaft K in the construction shown in Fig. 8 and may be provided with similar means for turning it and shifting the pilot valve in one direction or the other relatively to the cut-off valve. The head $y^5$ of the cut-off valve rod is also connected with an arm $z^5$ on a hollow upright rock shaft $Z^6$ which surrounds the pilot valve shaft $z^4$ and may be be connected with an indicating mechanism such as that shown in Figs. 8 and 9, so that the position of the cut-off valve and the parts connected therewith may be observed by the helmsman.

In the position of the pilot and cut-off valves represented in Fig. 12 the same are in their central position which corresponds to the central position of the rudder and of the pistons in the pilot cylinder and the primary and secondary cut-off cylinders. In this position of the pilot valve the end portions thereof cover both of the distributing ports $y^{11}, y^{12}$ and only the central exhaust port $y^{10}$ is in communication with the cavity on the underside of the pilot valve. Communication between the supply pipe $y$ and both distributing pipes is cut off and the apparatus is at rest. Upon moving the pilot valve in one direction so that its end portions uncover the distributing ports of the cut-off valve one of the distributing ports will be placed in communication with the supply pipe $y$ and permit the liquid under pressure to pass to one end of the pilot cylinder while the other distributing port will be placed by the cavity of the pilot valve in communication with the exhaust port and pipe, thereby permitting the liquid expelled from the opposite end of the pilot cylinder to escape therefrom. Upon moving the pilot valve in the opposite direction the relation of the distributing ports to the supply and exhaust pipes is reversed and the liquid in the pilot cylinder is caused to move the piston therein and the rudder connected therewith in the opposite direction. As the rudder is moved by the liquid in response to the shifting of the pilot valve to a predetermined position the piston of the secondary cylinder connected with the sliding cut-off valve is operated by the liquid transferring operation of the primary cut-off cylinder so that the cut-off valve follows the movement of the pilot valve until both distributing ports of the sliding cut-off valve are again closed by the end portions of the pilot valve and the rudder is brought to rest automatically at the predetermined position at which the pilot valve has been set. The valve mechanism shown in Figs. 11–16 operates in either direction and is also capable of effecting automatic restoration of the rudder when the same is deflected out of its position by abnormal conditions when combined with the relief mechanism shown in Figs. 6 and 7.

It will be observed that in this steering gear there is no lost motion in the train of parts which set the steering mechanism and the means which actually operate the rudder, thereby enabling the latter to be operated promptly and reliably and giving the master of a ship much better control over the same than has been possible by the use of the steering gears heretofore in use. It is also possible for the helmsman to determine with certainty whether or not the rudder responds to the setting device and is moving to the position desired and also enables him to observe when it reaches this position.

Furthermore, my improved steering gear permits of holding the rudder less rigidly in position than has been necessary heretofore inasmuch as it is automatically returned to its normal position immediately after the strain upon the same is removed, thereby reducing the liability of breaking the rudder or its operating mechanism.

Although the construction shown in the drawings is the best embodiment of my invention which has occurred to me and has proven satisfactory in use, it is to be understood that the invention is not limited to the structure here shown as the same may be varied and still contain the essence of my invention.

I claim as my invention:

1. A steering gear for ships comprising a motor cylinder, a piston arranged in the cylinder and operatively connected with the rudder of the ship, means for admitting a pressure medium to and exhausting the same from opposite ends of said cylinder, a pilot valve for directing the action of the pressure medium, and means for automatically arresting the action of the pressure medium when the rudder has been moved to the position corresponding to the position at which the pilot valve has been set comprising a cut-off valve coöperating with the pilot valve and means for causing said cut-off valve to move in unison with the rudder comprising a primary cut-off cylinder, a primary cut-off piston arranged in said primary cylinder and operatively connected with the rudder, a secondary cut-off cylinder, a secondary cut-off piston arranged in the secondary cylinder and operatively connected with the cut-off valve, and conduits for transmitting an actuating medium connecting opposite ends of the primary cut-off cylinder with opposite ends of the secondary cut-off cylinder.

2. A steering gear for ships comprising a pilot cylinder, a piston arranged in the pilot cylinder and operatively connected with the rudder, a pipe adapted to supply an active pressure liquid, an exhaust pipe adapted to receive the spent pressure liquid, liquid distributing pipes connected with opposite ends of the pilot cylinder, a primary cut-off cylinder, a primary cut-off piston operatively connected with the rudder, a secondary cut-off cylinder having its opposite ends connected with opposite ends of the primary cut-off cylinder by conduits which shift liquid from one of these cylinders to the other, a secondary cut-off piston arranged in the secondary cylinder, a pilot valve for connecting said distributing pipes with said supply pipe or with said exhaust pipe, and a cut-off valve operatively connected with said secondary cut-off piston and adapted to cut off said distributing pipes from said supply and exhaust pipes.

Witness my hand this 7th day of January, 1909.

JOHN S. BLAUVELT.

Witnesses:
 THEO. L. POPP,
 ANNA HEIGIS.

Copies of this patent may be obtained for five cents each, by addressing the "Commissioner of Patents, Washington, D. C."